United States Patent
Cho et al.

(10) Patent No.: US 7,277,458 B2
(45) Date of Patent: Oct. 2, 2007

(54) APPARATUS AND METHOD FOR TRACKING A PHASE OF A PSEUDO-RANDOM NOISE (PN) SEQUENCE OF A PILOT SIGNAL IN A MOBILE TERMINAL

(75) Inventors: Young-Kwon Cho, Suwon-si (KR); Sang-Min Bae, Kyonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 571 days.

(21) Appl. No.: 10/657,698

(22) Filed: Sep. 9, 2003

(65) Prior Publication Data

US 2004/0166810 A1   Aug. 26, 2004

(30) Foreign Application Priority Data

Sep. 10, 2002   (KR) .................. 10-2002-0054574

(51) Int. Cl.
*H04J 3/06* (2006.01)
*H04B 1/00* (2006.01)

(52) U.S. Cl. .................. 370/515; 370/519; 375/141

(58) Field of Classification Search ............. 455/67.16, 455/67.11, 130, 456.1, 136, 12.1, 522, 69; 370/349, 342, 335; 375/147, 141
See application file for complete search history.

(56) References Cited

U.S. PATENT DOCUMENTS

| | | | |
|---|---|---|---|
| 4,262,360 A * | 4/1981 | Bigo et al. .................. 375/321 |
| 5,490,165 A * | 2/1996 | Blakeney et al. ........... 370/335 |
| 5,982,809 A * | 11/1999 | Liu et al. ..................... 375/147 |
| 6,246,717 B1 * | 6/2001 | Chen et al. .................. 375/226 |
| 6,463,091 B1 * | 10/2002 | Zhodzicshsky et al. ..... 375/149 |
| 6,658,045 B1 * | 12/2003 | Jin ............................... 375/147 |
| 6,687,316 B1 * | 2/2004 | McGraw ...................... 375/343 |
| 6,744,404 B1 * | 6/2004 | Whitehead et al. ..... 342/357.12 |
| 6,795,452 B2 * | 9/2004 | Iancu .......................... 370/515 |
| 6,944,143 B1 * | 9/2005 | Bayley et al. .............. 370/332 |
| 6,944,149 B1 * | 9/2005 | Kim et al. ................... 370/349 |
| 6,999,778 B2 * | 2/2006 | DiBuduo .................. 455/456.1 |
| 2003/0176203 A1 * | 9/2003 | Sih et al. ..................... 455/522 |
| 2005/0020219 A1 * | 1/2005 | Sih et al. ..................... 455/130 |

* cited by examiner

*Primary Examiner*—Tilahun Gesesse
(74) *Attorney, Agent, or Firm*—Roylance, Abrams, Berdo & Goodman, L.L.P.

(57) ABSTRACT

An apparatus and method are disclosed for acquiring by a mobile terminal a pseudo-random noise (PN) sequence of a pilot signal received from a base station by means of a searcher, designating a phase of the acquired PN sequence as a reference phase to track the phase of the acquired PN sequence, and measuring an energy difference between an early path and a late path for the reference phase in a mobile communication system. In the apparatus and method, a first energy measurer measures a first energy value from a PN sequence with the reference phase, and a second energy measurer alternately measures energy values of the early path and the late path for the reference phase and outputs a second energy value. A first normalizer normalizes the first energy value with the second energy value, and a delay processor delays the normalized energy value for a predetermined time; a subtractor calculates a difference between the normalized energy value output from the first normalizer and the energy value output from the delay processor.

22 Claims, 9 Drawing Sheets

APPARATUS AND METHOD FOR TRACKING A PHASE OF A PSEUDO-RANDOM NOISE (PN) SEQUENCE OF A PILOT SIGNAL IN A MOBILE TERMINAL

PRIORITY

This application claims priority under 35 U.S.C. § 119 to an application entitled "Apparatus and Method for Tracking a Phase of PN Sequence of a Pilot Signal in a Mobile Terminal" filed in the Korean Intellectual Property Office on Sep. 10, 2002 and assigned Ser. No. 2002-54574, the contents of which are incorporated herein by reference.

BACKGROUND OF THE INVENTION

1. Field of the Invention

The present invention relates generally to an apparatus and method for recovering a phase of a pseudo-random noise (PN) sequence from a pilot signal by a mobile terminal in a mobile communication system, and for instance, to an apparatus and method for tracking a phase of a PN sequence, using a Tau-Dither Loop (TDL) scheme.

2. Description of the Related Art

In a mobile communication system, a pilot signal provides a mobile terminal with timing information, phase reference information and reference information for identifying a base station. The pilot signal is always assigned a Walsh code #0, and spread by a PN sequence, with no information carried thereon. That is, the pilot signal becomes a PN sequence.

The pilot signal provides information on a continuous basis or on a burst basis. While a conventional voice-centered mobile communication system has provided a continuous pilot signal, a packet-centered multimedia system such as 1× EVolution-Data Only (1×EV-DO), Telecommunications Industry Association/Electronic Industries Alliance/Interim Standard-856 (TIA/EIA/IS-856), system provides a burst pilot signal in order to optimize transmission efficiency of the system.

FIG. 1 is a block diagram illustrating an example of a frame format for a mobile communication system in which a burst pilot signal is provided. As illustrated, for $N_1$-chip durations 101 and 105, a pilot signal is periodically transmitted. In addition, for $N_2$-chip durations 103 and 107, information data is periodically transmitted. The burst signal represents signal transmitted periodically or signal transmitted by a predetermined time. The present invention touchs on pilot signal as a burst signal. In the 1×EV-DO system, $N_1$ and $N_2$ means 96 chips and 928 chips, respectively.

In a receiver, or a mobile terminal, a process of recovering a phase of a PN sequence from the pilot signal is roughly divided into an acquisition step and a tracking step. In the light of a phase recovery resolution, the PN sequence acquisition step refers to a process of adjusting a phase of a local PN sequence so that a difference between a phase of a PN sequence of a received pilot signal and a phase of the local PN sequence generated in the receiver falls within a 1-chip length. Generally, the PN sequence acquisition step is performed in a searcher.

The PN sequence tracking step is to precisely track a phase of a PN sequence acquired by the searcher so that a phase difference between the acquired PN sequence and the PN sequence of the received pilot signal becomes less than a 1-chip length. In addition, the purpose of the PN sequence tracking step is to prevent reception quality deterioration due to relative movement of a base station and a mobile terminal or unstableness of a reference clock within the receiver. In a receiver of a mobile communication system, the PN sequence tracking step is performed in a finger, generally using either a delay lock loop (DLL) scheme or a tau-dither loop (TDL) scheme.

Both schemes designate a PN sequence's phase tracked in a previous PN sequence tracking step as a reference phase, and track an accurate phase of the PN sequence based on an energy difference between an early path preceding the reference phase by a predetermined phase and a late path behind the reference phase by the predetermined phase. The predetermined phase has a 1-chip length, or a ¼ or ½-chip length which is shorter than the 1-chip length. In an additive white Gaussian noise (AWGN) environment where no fading exists on a transmission channel, an energy difference between the early path and the late path is calculated by $$E(\Delta \xi(\tau)) = N_1^2 E_c \left[ R^2\left(\frac{\tau - \Delta}{T_c}\right) - R\left(\frac{\tau + \Delta}{T_c}\right) \right] \quad (1)$$

In this equation, $N_1$ represents the number of chips during which the early and the late energy are measured, $E_c$ represents chip energy, $T_c$ represents a chip duration, and $R(\cdot)$ represents an autocorrelation function of an impulse response of a pulse shaping filter. In addition, $\tau$ is a value representing a relative time difference between a reference phase and a PN sequence's phase of a received pilot signal. Specifically, $\tau$ is given subtracting a PN sequence's phase of the received pilot signal from an acquired PN sequence's phase. In addition, $\Delta$ represents an incremental a phase by which the early path precedes the reference phase or the late path is behind the reference phase. Therefore, '$\tau-\Delta$' represents a phase of the early p, and '$\tau+\Delta$' represents a phase of the late path. Herein, compared to the early path and the late path, a path of the reference phase is defined as an "on-time path."

Meanwhile, the DLL scheme and the TDL scheme are different from each other in terms of the time instance at which the energies of the early path and the late path are being measured. The DLL scheme simultaneously calculates energies of the early path and the late path, whereas the TDL scheme sequentially calculates energies of the early path and the late path. The TDL scheme is simpler than the DLL scheme in hardware while providing a margin degradation in performance, thus contributing to power reduction. Therefore, the TDL scheme is preferred.

FIG. 2 is a block diagram illustrating an example of a PN sequence phase tracking apparatus employing the conventional TDL scheme (hereinafter referred to as "TDL PN sequence phase tracking apparatus"). Specifically, FIG. 2 illustrates a structure of a part for calculating an energy difference between an early path and a late path in accordance with Equation (1) when a burst pilot signal of FIG. 1 is provided. With reference to FIGS. 1 and 2, a detailed description will now be made of the conventional TDL scheme.

The PN sequence phase tracking apparatus employing the TDL scheme comprises of a first energy measurer 10 and a second energy measurer 20. The first energy measurer 10 sequentially calculates energies of an early path and a late path, and the second energy measurer 20 calculates a difference between the energy values of the early path and the late path, sequentially calculated in the first energy measurer 10.

After being converted into a baseband complex signal r, a pilot signal received from a base station is applied to a complex PN despreader 201. The baseband complex signal r is subjected to complex PN despreading in the complex PN despreader 201 by a PN sequence generated in any one of a first local PN sequence generator 205 and a second local PN sequence generator 207. The first and second local PN sequence generators 205 and 207, respectively, generate PN sequences of which phase precedes and are behind a reference phase by a predetermined phase. If it is assumed that a reference phase is τ and the predetermined phase is Δ, the first local PN sequence generator 205 generates a PN sequence having a phase 'τ−Δ', whereas the second local PN sequence generator 207 generates a PN sequence having a phase 'τ+Δ'.

Based on the value of a function s(t), a switch 203 selects any one of the first local PN sequence generator 205 and the second local PN sequence generator 207 so that energies of the early path and the late path are alternately measured every pilot . For s(t)=+1, the first local PN sequence generator 205 is selected to calculate an energy value of the early path. For s(t)=−1, the second local PN sequence generator 207 is selected to calculate an energy of the late path.

The complex signal r despread by the local PN sequence in the complex PN despreader 201 is separated into an in-phase component and a quadrature-phase component and then provided to a first accumulation averager 209 and a second accumulation averager 211, respectively. Outputs of the first and second accumulation averagers 209 and 211 are provided to first and second squarers 213 and 215, respectively. Signals output from the first and second squarers 213 and 215 are summed up in a summer 217. An output of the summer 217 corresponds to an energy value of the early path or the late path according to a value of the s(t).

The output of the summer 217 is provided to a latch 219 and a subtractor 221. The latch 219 serves as a delay for generating a time delay corresponding to $(N_1+N_2)$-chip duration illustrated in FIG. 1. The subtractor 221 calculates a difference between the output of the summer 217 and the output of the latch 219, and provides its output to a multiplier 223. The multiplier 223 multiplies an output of the subtractor 221 by the function s(t). An output of the multiplier 223 corresponds to an energy difference between the early path and the late path.

However, in case the channel gain fluctuates due to fading the TDL scheme cannot track accurately an actual energy difference between the early path and the late path. This is because the channel gain when the energy of the early (or late) path is being measured may differ from that when the late (or early) path is being measured and, therefore, the same coefficient cannot be applied for both terms on the right hand side of Equation (1). That is, in case the channel gain fluctuates, the energy difference between the early path and the late path is not given by Equation (1) any further.

However, energies of an early path and a late path are simultaneously measured in the DLL scheme. Therefore, the DLL scheme is superior to the TDL scheme in performance. However, since the DLL scheme must include a separate device for measuring energies of the early path and the late path, its hardware complexity and power consumption are relatively high compared to those of the TDL.

Meanwhile, the performance of the TDL scheme tends to deteriorate as the time interval between pilot bursts increases. This is because the energy difference between the early path and the late path cannot be measured exactly due to the time-varying channel gain. In the case of the TDL, accordingly, an apparatus and method for combating the effect of channel fading are highly required.

SUMMARY OF THE INVENTION

It is, therefore, an object of the present invention to provide an apparatus and method for accurately tracking a PN sequence phase in an environment where fading exists on a transmission channel in a mobile communication system.

It is another object of the present invention to provide an apparatus and method for reducing an error due to fading on a transmission channel without increasing hardware complexity in a PN sequence phase tracking apparatus.

It is further another object of the present invention to provide an apparatus and method for accurately tracking a PN sequence phase regardless of an influence of fading on a transmission channel in a mobile communication system in which a burst pilot signal is provided.

In accordance with one aspect of the present invention, there is provided an apparatus for acquiring a phase of a pseudo-random noise (PN) sequence acquired from a signal received from a base station in a mobile communication system. The apparatus comprises a first energy measurer for measuring each energy of an early path and a late path from the acquired PN sequence; a second energy measurer for measuring an energy of an on-time path from the acquired PN sequence; a first normalizer for normalizing an energy of the first energy measurer with an energy measured by the second energy measurer; and a third energy measurer for tracking a phase of the PN sequence using the normalized energy from the first normalizer.

In accordance with another aspect of the present invention, there is provided a method for acquiring a phase of a pseudo-random noise (PN) sequence acquired from a signal received from a base station in a mobile communication system. The method comprises the steps of: measuring by a first energy measurer each energy of an early path and a late path from the acquired PN sequence, said energy being first energy; measuring by a second energy measurer an energy of an on-time path from the acquired PN sequence, said energy being second energy; normalizing by a first normalizer the first energy with the second energy; and tracking a phase of the PN sequence using the normalized energy value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will now be described in detail with reference to the accompanying drawings. In the following description, a detailed description of known functions and configurations incorporated herein has been omitted for conciseness.

Figure 2:
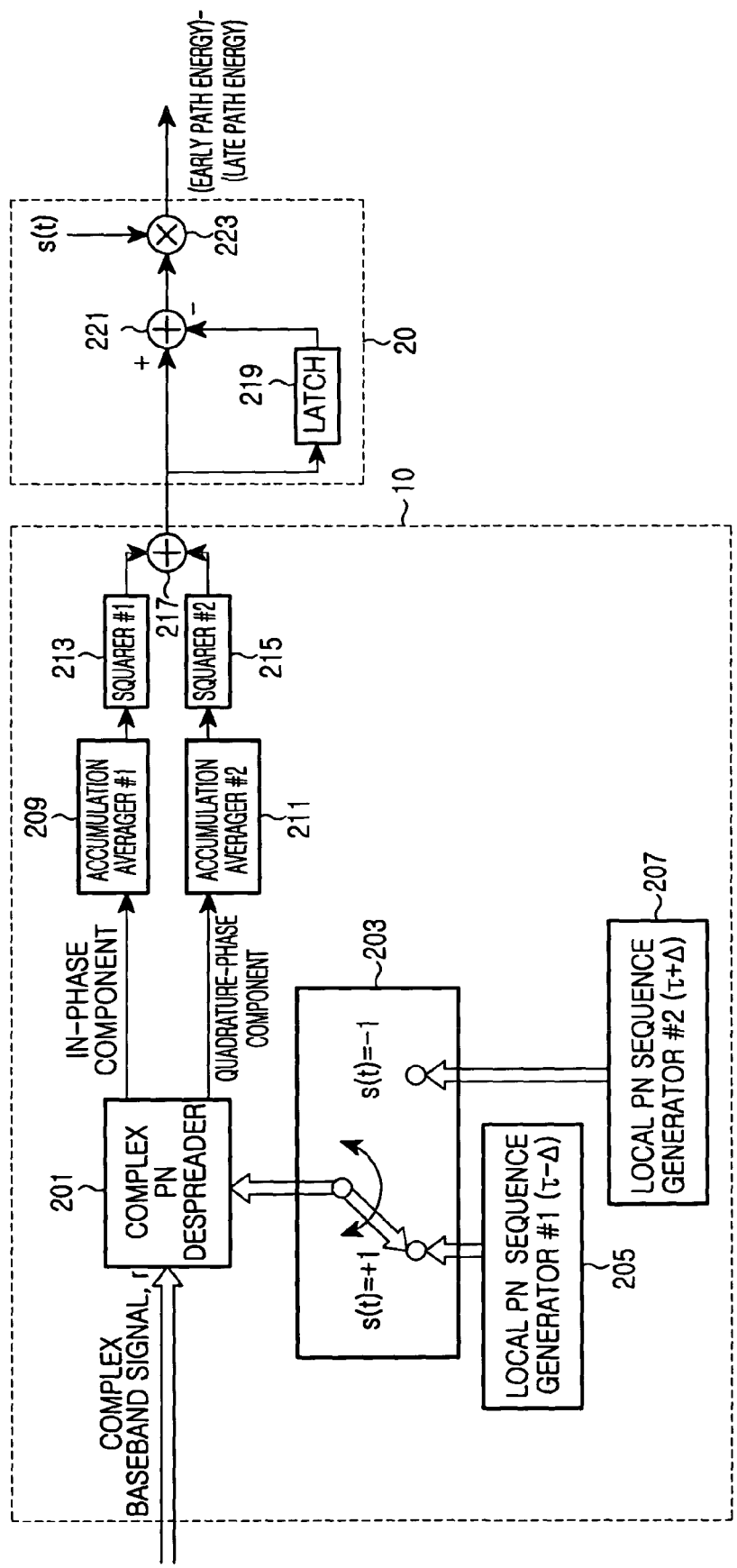
FIG. 2 is a block diagram illustrating an example of an apparatus for measuring an energy difference between an early path and a late path in a conventional TDL PN sequence phase tracking apparatus.

Herein, a detailed description will be made of an problem which may occur in a conventional TDL PN sequence phase tracking apparatus as illustrated in FIG. 2 when fading exists on a transmission channel. The embodiment of the present invention provides an apparatus and method for combating the problem.

Figure 1:
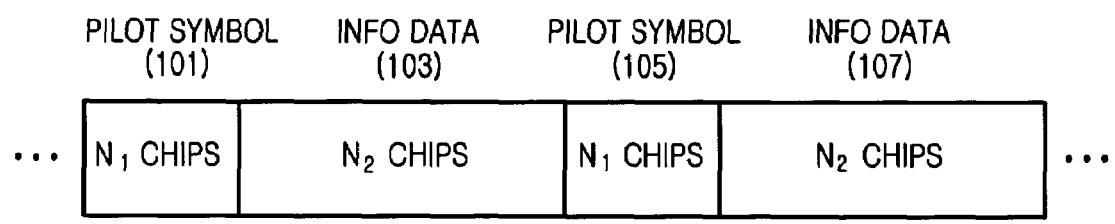
FIG. 1 is a block diagram illustrating an example of a frame format for a mobile communication system in which a burst pilot signal is provided.

When fading exists in a system where a burst pilot signal shown in FIG. 1 is provided, an energy difference between an early path and a late path, actually measured in the PN sequence phase tracking apparatus of FIG. 2, can be expressed as $$E(\Delta\xi'(\tau) \mid \alpha(\tau), \alpha(\tau+(N_1+N_2)T_c) \approx \qquad (2)$$

$$\alpha^2(t)R^2\left(\frac{\tau-\Delta}{T_c}\right) - \alpha^2(t+(N_1+N_2)T_c)R^2\left(\frac{\tau+\Delta}{T_c}\right) =$$

$$r_{early}^2(t)R^2\left(\frac{\tau-\Delta}{T_c}\right) - r_{late}^2(t)R^2\left(\frac{\tau+\Delta}{T_c}\right)$$

Here, it is assumed that $N_1 \ll N_2$, and fading on a transmission channel is almost constant during each burst of pilot signal. $\Delta\xi'(T)$ is an instantaneous value of an energy difference between an early path and a late path, which is normalized by $N_1^2 E_c$, and $\alpha(t)$ is a fading envelope at time t, which follows a Rayleigh distribution. In Equation (2), $r_{early}(t)$ and $r_{late}(t)$ are defined as $$r_{early}(t) = \alpha(t)$$

$$r_{late}(t) = \alpha(t+(N_1+N_2)T_c) \qquad (3)$$

Since $r_{early}(t)$ and $r_{late}(t)$ are correlated with each other and each of them follows a Rayleigh distribution, their joint statistics follows a bivariate Rayleigh distribution, of which probability density function is given by $$p_{R_{early},R_{late}}(r_{early},r_{late}) \mid \rho) = \frac{4r_{early}r_{late}}{1-\rho} \cdot \qquad (4)$$

-continued
$$\exp\left(-\frac{r_{early}^2 + r_{late}^2}{1-\rho}\right) \cdot$$

$$I_0\left(\frac{2\sqrt{\rho}\,r_{early}r_{late}}{1-\rho}\right),$$

$$r_{early}, r_{late} \geq 0.$$

where $$\rho = \frac{cov(r_{early}^2, r_{late}^2)}{\sqrt{var(r_{early}^2)var(r_{late}^2)}}$$

is the correlation coefficient between $r_{early}$ and $r_{late}$, $I_0(\cdot)$ represents the zeroth-order modified Bessel function of the first kind, and both $E(r^2_{early})$ and $E(r^2_{late})$ are assumed to be 1. In Equation (4), the argument t of $r_{early}(t)$ and $r_{late}(t)$ have been omitted for the notational simplicity. From the relationship, $p(a|b) = p(a,b)/p(b)$, and $\rho_{R_{late}}(r_{late}) = 2r_{late}\exp(-r_{late}^2)$, the pdf of $r_{early}$ conditioned on $r_{late}$ is obtained as $$p_{R_{early}|R_{late}}(r_{early} \mid r_{late}, \rho) = \frac{2r_{early}}{1-\rho} \cdot \qquad (5)$$

$$\exp\left(-\frac{r_{early}^2 + \rho r_{late}^2}{1-\rho}\right) \cdot$$

$$I_0\left(\frac{2\sqrt{\rho}\,r_{early}r_{late}}{1-\rho}\right),$$

$$r_{early}, r_{late} \geq 0$$

By averaging Equation (2) over the distribution of $r_{early}$ conditioned on $r_{late}$, the average of the energy difference between an early path and a late path can be obtained as $$\bar{\xi}(\tau \mid r_{late}, \rho) = \int_0^\infty E(\Delta\xi'(\tau) \mid \alpha(t), \alpha(t+(N_1+N_2)T_c)) \cdot \qquad (6)$$

$$p_{R_{early}|R_{late}}(r_{early} \mid r_{late}, \rho)dr_{early}$$

$$\approx \int_0^\infty \left[r_{early}^2 R^2\left(\frac{\tau-\Delta}{T_c}\right) - r_{late}^2 R^2\left(\frac{\tau+\Delta}{T_c}\right)\right] \cdot$$

$$p_{R_{early}|R_{late}}(r_{early} \mid r_{late}, \rho)dr_{early}$$

$$= C_{early}(r_{late},\rho)R^2((\tau-\Delta)/T_c) -$$

$$C_{late}(r_{late},\rho)R^2((\tau-\Delta)/T_c)$$

where $C_{early}(r_{late}, \rho)$ and $C_{late}(r_{late}, \rho)$ are defined as $$C_{early}(r_{late},\rho) = \frac{2}{1-\rho}\int_0^\infty r_{early}^2 p_{R_{early}|R_{late}}(r_{early} \mid r_{late},\rho)dr_{early} \qquad (7)$$

$$C_{late}(r_{late},\rho) = \frac{2}{1-\rho}r_{late}^2\int_0^\infty p_{R_{early}|R_{late}}(r_{early} \mid r_{late},\rho)dr_{early}$$

From Equation (6) and Equation (7), it is observed that unlike Equation (1), coefficients for autocorrelation functions for the early path and the late path are different from each other. Thus, in an environment where fading exists on a transmission channel, an energy difference between the early path and the late path, as measured by the conventional TDL apparatus of FIG. 2, is not identical to an actual energy difference.

Figure 3:
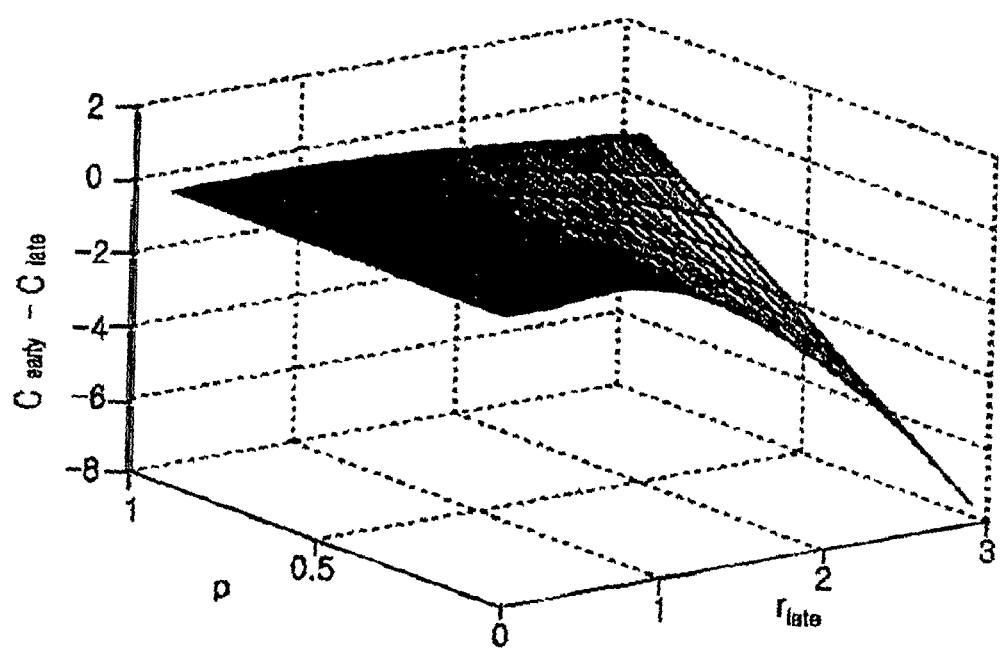
FIG. 3 is a three dimensional graph illustrating an example of a variation in a $(C_{early}-C_{late})$ value for $r_{late}(t)$ and ρ in a conventional TDL PN sequence phase tracking apparatus.

FIG. 3 is a three dimensional graph illustrating a variation of ($C_{early}$-$C_{late}$) as a function of $r_{late}$ and $\rho$ in a conventional TDL PN sequence phase tracking apparatus. It is noted in FIG. 3 that as a correlation coefficient $\rho$ decreases, the disparity between $C_{early}$ and $C_{late}$ tends to increase. The disparity between Cearly and Clate may distort the energy difference between an early path and a late path, which otherwise will be given by Equation (1). This will lead to the performance degradation of the conventional TDL scheme.

Figure 4:
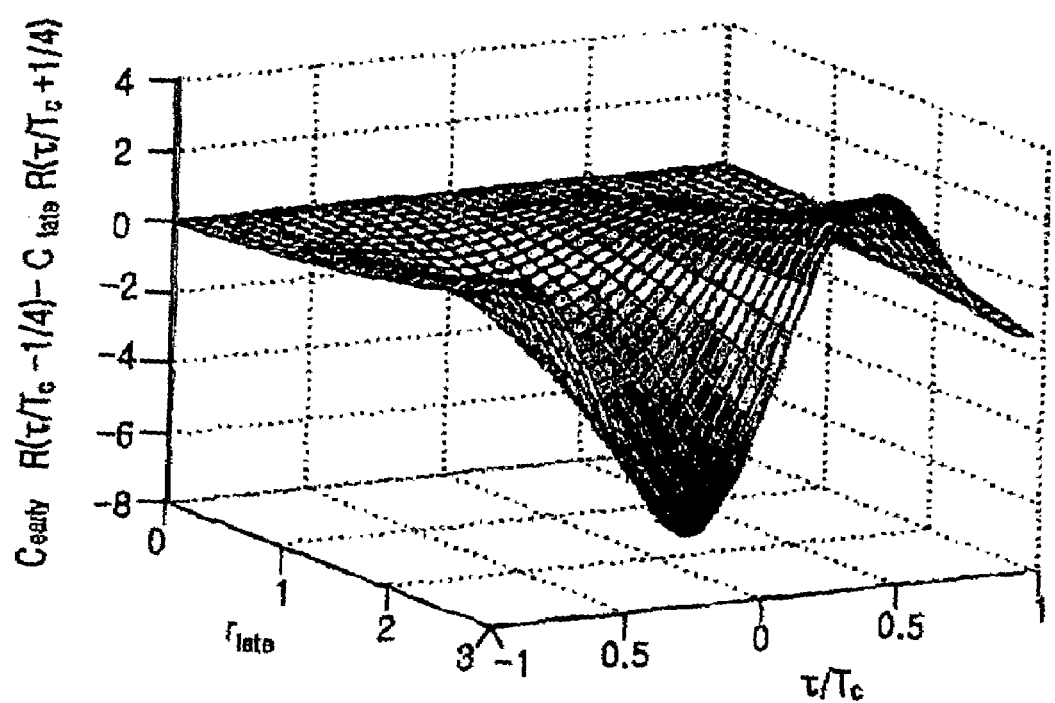
FIG. 4 is a three dimensional graph illustrating an example of a variation in $\xi(\tau,r_{late}(t),\rho)$ for $\tau/T_c$ and $r_{late}(t)$ when ρ=0.5 and $\Delta=T_c/4$ in a conventional TDL PN sequence phase tracking apparatus.

FIG. 4 illustrates a variation of $\bar{\xi}(\tau|r_{late},\rho)$ as a function of $\tau/T_c$ and $r_{late}$ when $\rho$=0.5 and $\Delta$=$T_c$/4. The chip duration $T_c$ was assumed to be 1/1.2288 μsec, and $N_1$ and $N_2$ were assumed to be 96 and 928, respectively. The Doppler frequency $f_m$ corresponding to $\rho$ of 0.5 could be found to be 215.1 Hz, assuming that $\rho \sim (J_0(2\pi f_m \Delta t))^2$ where $J_0(\cdot)$ represents the zeroth-order Bessel function of the first kind: using the fading samples generated by Jakes model, the $\rho$ corresponding to the $f_m$ of 215.1 Hz was empirically found to be about 0.48. Also, the same pulse-shaping filter as that specified in TIA/EIA/IS-95 standard was assumed.

In FIG. 4, it is shown that the slope of $\bar{\xi}(\tau|r_{late}, \rho)$ (in between two local extremes) is dependent on the instantaneous value of $r_{late}$, which implies that the performance of the conventional TDL scheme will be affected by channel fading. It is also shown that $\bar{\xi}(\tau|r_{late}, \rho)$ may take a value other than zero even when $\tau$=0.

Figure 5:
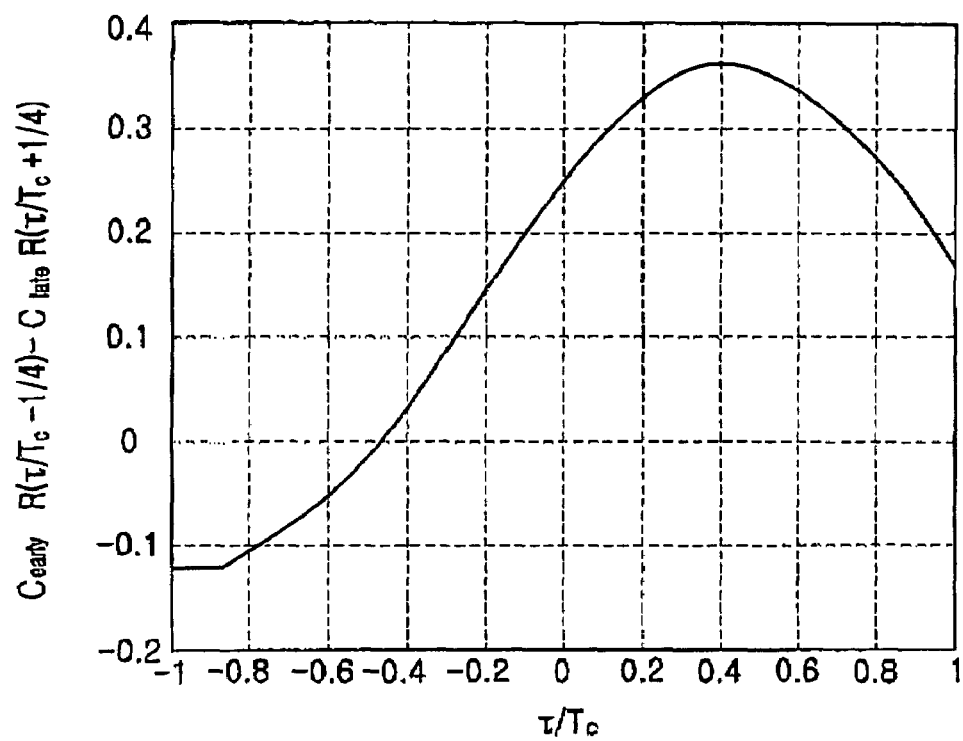
FIG. 5 is a graph illustrating an example of a variation in $\xi(\tau,r_{late}(t),\rho)$ for $\tau/T_c$ when $r_{late}(t)$ is 0.47 in the conventional TDL PN sequence phase tracking apparatus.
Figure 6:
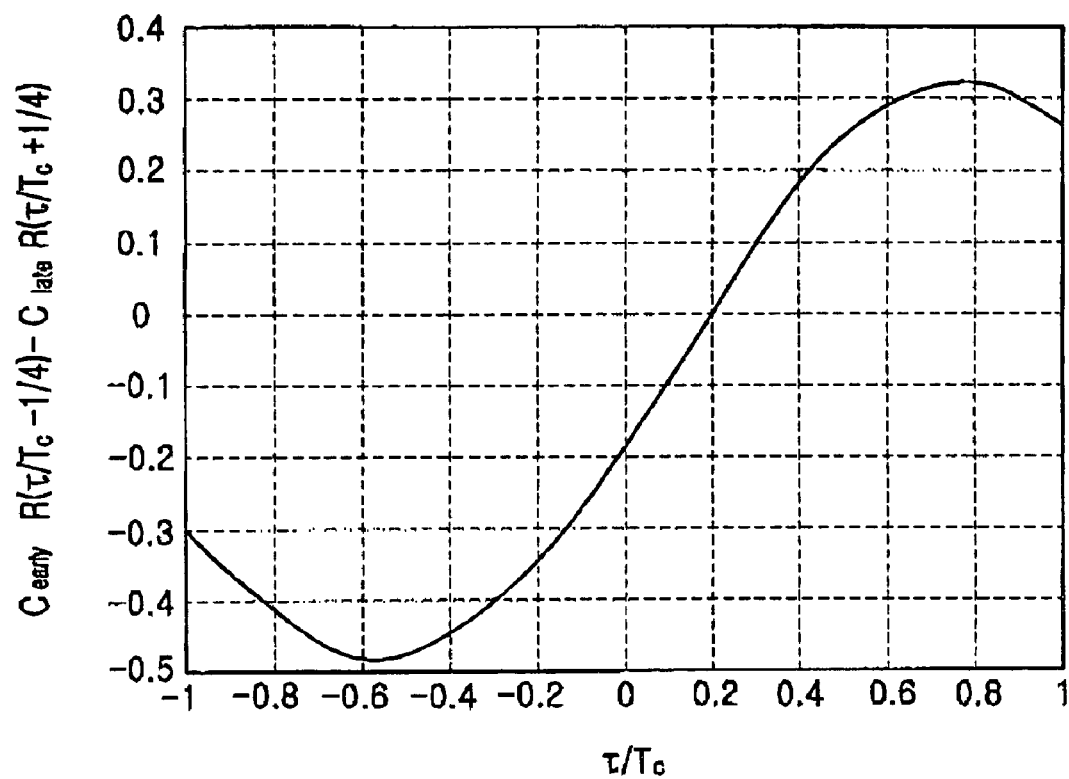
FIG. 6 is a graph illustrating an example of a variation in $\xi(\tau,r_{late}(t),\rho)$ for $\tau/T_c$ when $r_{late}(t)$ is 1.51 in the conventional TDL PN sequence phase tracking apparatus.

FIGS. 5 and 6 illustrate the variation of $\bar{\xi}(\tau|r_{late}, \rho)$ as a function of $\tau/T_c$ when $r_{late}(t)$ is 0.47 and 1.51, respectively. The values for any other parameters are the same as the corresponding ones assumed in FIG. 4. From FIGS. 5 and 6, it is learned that due to fading of a transmission channel, a PN sequence's phase tracked by the conventional TDL apparatus deviates from what it should be. Specifically, in FIG. 5 where $r_{late}$=0.47, a phase of a PN sequence deviates by about −0.5 $T_c$, and in FIG. 6 where $r_{late}$=1.51, a phase of a tracked PN sequence is deviated from what it should be by about 0.2$T_c$. That is, due to fading of a transmission channel, the phase of a tracked PN sequence may drift around the phase of a received PN sequence, and its convergence to the phase of a received PN sequence may not be guaranteed.

Figure 7:
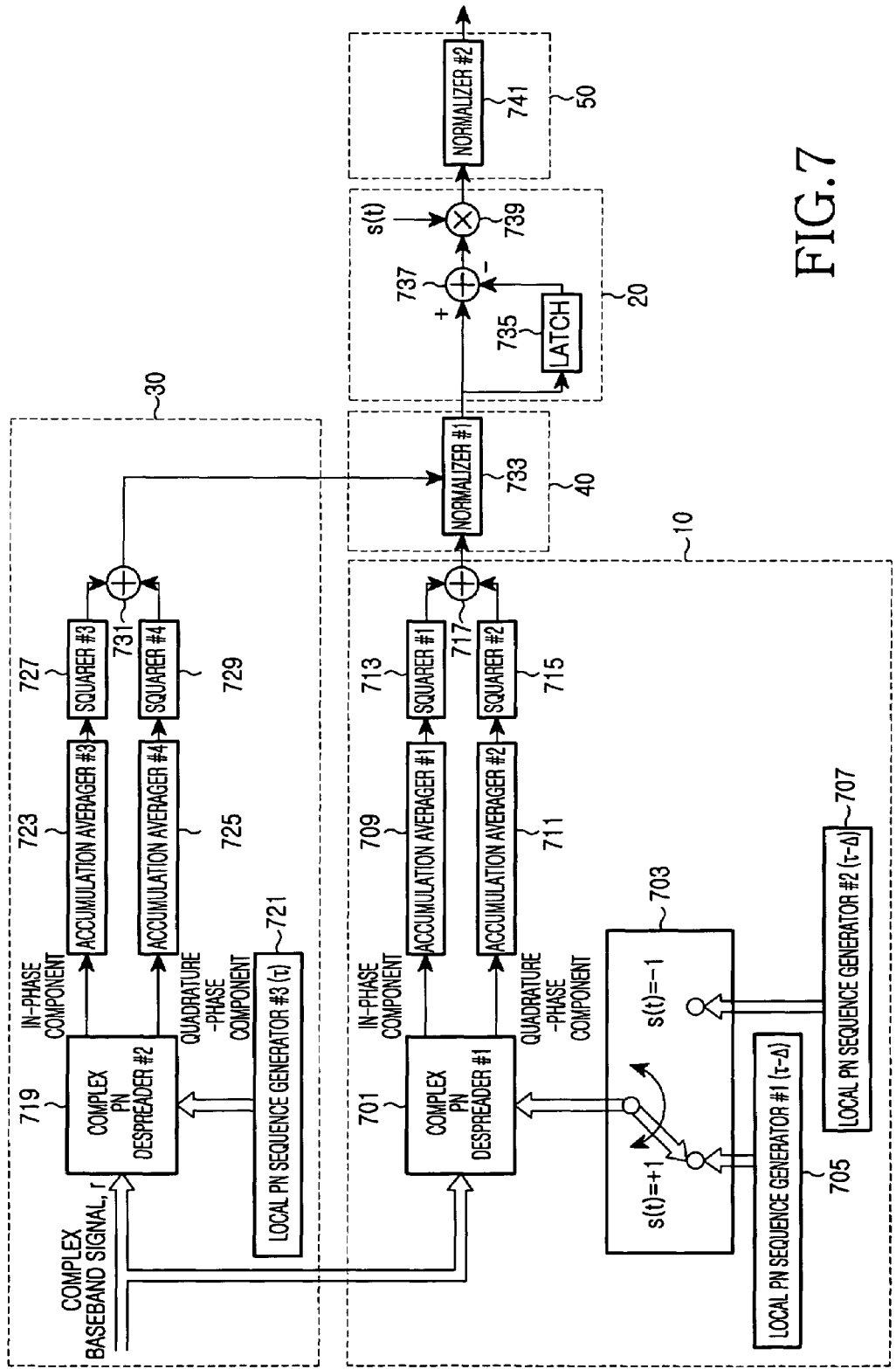
FIG. 7 is a block diagram illustrating an example of a TDLPN sequence phase tracking apparatus according to an embodiment of the present invention.

The invention provides an improved apparatus and method for resolving a problem encountered with the conventional TDL apparatus when fading exists on a transmission channel. FIG. 7 is a block diagram illustrating an apparatus for measuring an energy difference between an early path and a late path according to an embodiment of the present invention.

In FIG. 7, a first energy measurer 10 and a third energy measurer 20 correspond to the first energy measurer 10 and the second energy measurer 20 of FIG. 2. That is, the first energy measurer 10 is a block for alternately measures the energies of an early path and a late path. The third energy measurer 20 is a block that calculates the difference between the measured energies of the early path and the late path.

A second energy measurer 30, a first normalization section 40 and a second normalization section 50 are newly introduced parts by the embodiment of the present invention. The second energy measurer 30 measures an energy of an on-time path, while the first energy measurer 10 alternately measures energies of the early path and the late path.

The second energy measurer 30 is composed of the third local PN sequence generator 721, a complex PN despreader 719, a third accumulation averager 723, a fourth accumulation averager 725, a third squarer 727, a fourth squarer 729, and a second summer 731. The third local PN sequence generator 721 generates a PN sequence in a reference phase. If we focus on the TDL only, the second energy measurer 30, may seem additional for he embodiment of the present invention. The whole or part of the second energy measurer 30, however, is already built in a receiver for other purposes such as the channel estimation and the measurement of on-time path energy for automatic frequency control, and thus the introduction of the second energy measurer does not result in the increase in hardware in terms of the whole receiver. In FIG. 7, a first accumulation averager 709, a first multiplier 713, a second accumulation averager 711 and a second multiplier 715 in the first energy measurer 10, and a third accumulation averager 723, a third multiplier 727, a fourth accumulation averager 725 and a fourth multiplier 729 in the second energy measurer 30, measure energies of an in-phase component and a quadrature-phase component, respectively. It is obvious to those skilled in the art that there are many available energy measurement methods except the energy measurement method mentioned above.

The first normalization section 40 normalizes an energy of an early path or a late path, measured in the first energy measurer 10, with an energy of an on-time path, measured in the second energy measurer 30, and is composed of the first normalizer 733. The first normalizer 733 the energy measured by the first energy measurer 10 by the energy of the on-time path, measured in the second energy measurer 30. In the embodiment of the present invention, the first normalizer 733 changes the measured energy value of the early path or the late path. Since an energy of the early path or the late path is measured simultaneously with energy of the on-time path, the fluctuation of the energy of the early path or the late path due to fading will be nearly the same as that the energy of the on-time path. That is, the purpose of this normalization is to reduce the disparity $C_{early}$ and $C_{late}$ in the conventional TDL scheme, and thus to enhance the performance of the embodiment of the present invention.

The second normalization section 50 adjusts the dynamic range of the an energy difference between the early path and the late path, and is composed of the second normalizer 741. When an energy of the on-time path approaches 0, energies of the early path and the late path, normalized by the energy fo the on-time path, have extremely large values. Thus, the second normalizer 741 is introduced to reduce the dynamic range of the input signal and to make the output be within a tractable range for subsequent processing. For a given input x, the output y of the second normalizer 741 is given by $$y = \sqrt{2} \cdot x \cdot \exp\left(-\frac{|x|}{\sqrt{e}}\right) \qquad (8)$$

Figure 8:
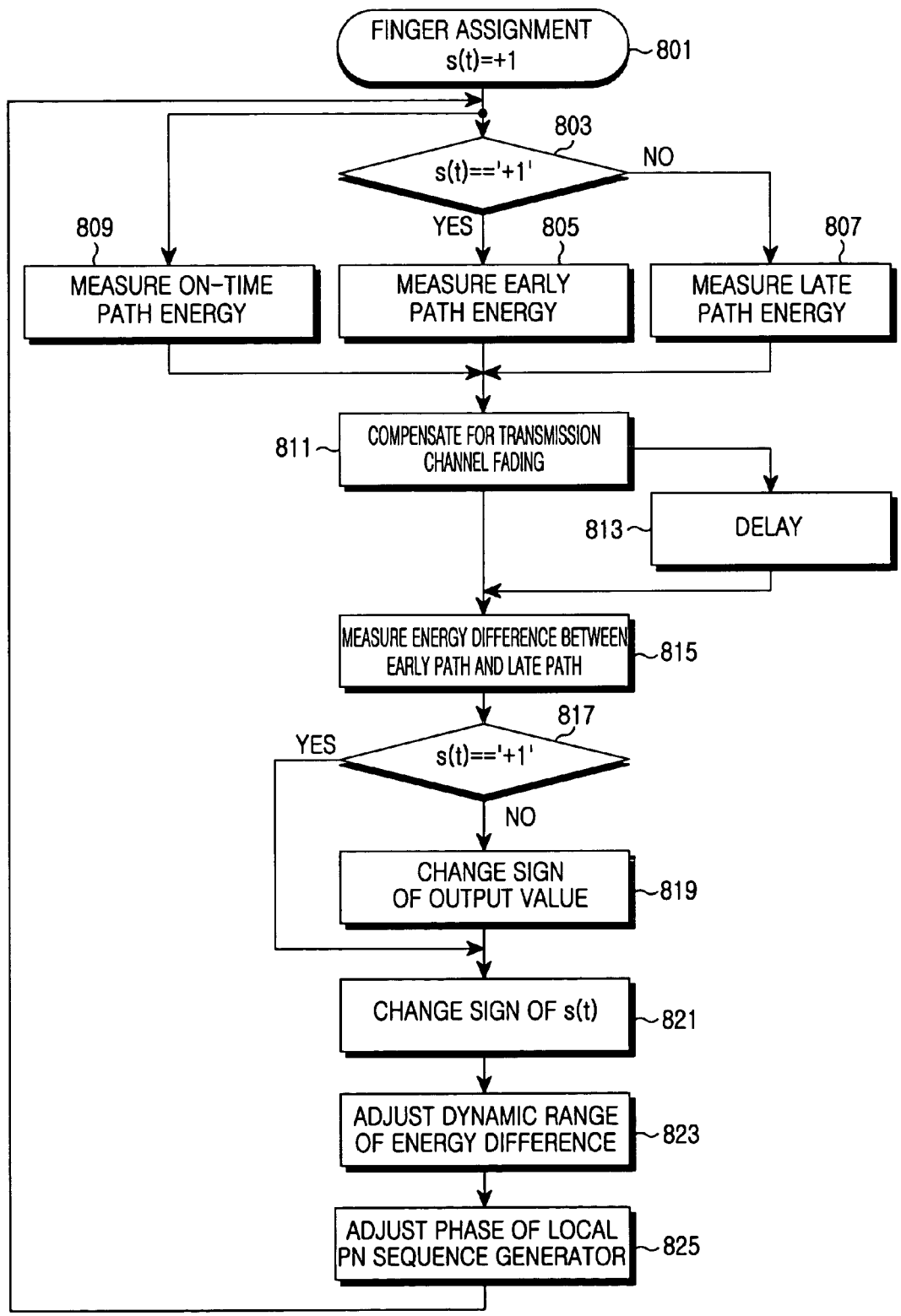
FIG. 8 is a flowchart illustrating an example of a procedure for a TDL PN sequence phase tracking apparatus according to an embodiment of the present invention.

Equation (8) was found empirically, However, for the reduction of implementation complexity, a normalization function other than $\exp[\mu/\sqrt{e}]/\sqrt{2}$ may be used. For instance, when the energy values of the early path and the late path, normalized by a dividing operation performed in the first normalizer 733 of the first normalization section 40, have a very high peak value, the energy values larger than a predetermined value are discarded. FIG. 8 is a flowchart illustrating an example of an operation of the TDL apparatus illustrated in FIG. 7 according to an embodiment of the present invention. A method for measuring an energy difference between an early path and a late path will now be described in detail with reference to FIGS. 7 and 8. The first and third energy measurers 10 and 20 have been described in conjunction with FIG. 2, so a detailed description thereof will be omitted for simplicity.

A phase of a PN sequence is acquired in a non-depicted searcher of a PN sequence acquisition apparatus in a mobile terminal, and the acquired PN sequence's phase is assigned to a finger by a finger assignment block in step 801. Further, in step 801, a function s(t) is set to +1. Based on the value of a function s(t), the switch 703 is connected to the first local PN sequence generator 705 or the second local PN sequence generator 707 so that the first energy measurer 10 can alternately measure the energies of the early path and the late path.

In step 803, it is checked whether the value of a function s(t) is determined +1 or −1. If s(t)=+1, the first energy measurer 10 measures an energy value of the early path in step 805. In contrast, if s(t)=−1, the first energy measurer 10 measures an energy value of the late path in step 807. While the steps 805 and 807 are performed, the second energy measurer 30 measures an energy value of the late path in step 809.

Step 811 is performed by the first normalization section 40, i.e., the first normalizer 733, to combat the effect of fading. In step 811, an energy of the early path or the late path, from the first energy measurer 10, is normalized energy of an on-time path, from the second energy measurer 30. That is, energies of the early path and the late path measured under the effect of fading are adjusted and the effect of fading is removed. In steps 813 and 815, the normalized energy of the early path or the late path is applied to a latch 735 and a subtractor 737 in the third energy measurer 20. In step 813, the latch 735 generates a time delay corresponding to $(N_1+N_2)$-chip duration as shown in FIG. 1. In step 815, the subtractor 737 calculates a difference between an output of the first normalizer 733 and an output of the latch 735, and outputs the result to a multiplier 739. If s(t) is +1, an energy of the early path is measured in the first energy measurer 10 and a previously measured energy of the late path is output from the latch 735. Therefore, an energy difference determined by subtracting an energy of the late path from an energy of the early path is output from the subtractor 737. In contrast, if a value of the s(t) is −1, an energy of the late path is measured in the first energy measurer 10 and a previously measured energy of the early path is output from the latch 735. Therefore, an energy difference determined by subtracting an energy of the early path from an energy of the late path is output from the subtractor 737.

In step 817, a value of the function s(t) is determined. If the s(t) is +1, the procedure proceeds to step 821, and if the s(t) is −1, the procedure proceeds to step 819. In step 819, a sign of a value output from the subtractor 737 is toggled, and in step 821, a sign of the s(t) is toggled. Steps 817 to 821 make the PN sequence phase tracking apparatus calculate the energy difference between the early path and of the late path. Steps 817 to 821 correspond to multiplying an output of the subtractor 737 by the s(t) through the multiplier 739 as illustrated in FIG. 7.

In step 823, the energy difference between the early path and the late path is normalized according to the second normalizer 741. In step 825, a reference phase τ is adjusted according to the measured energy difference, and then the procedure returns to step 803.

Figure 9:
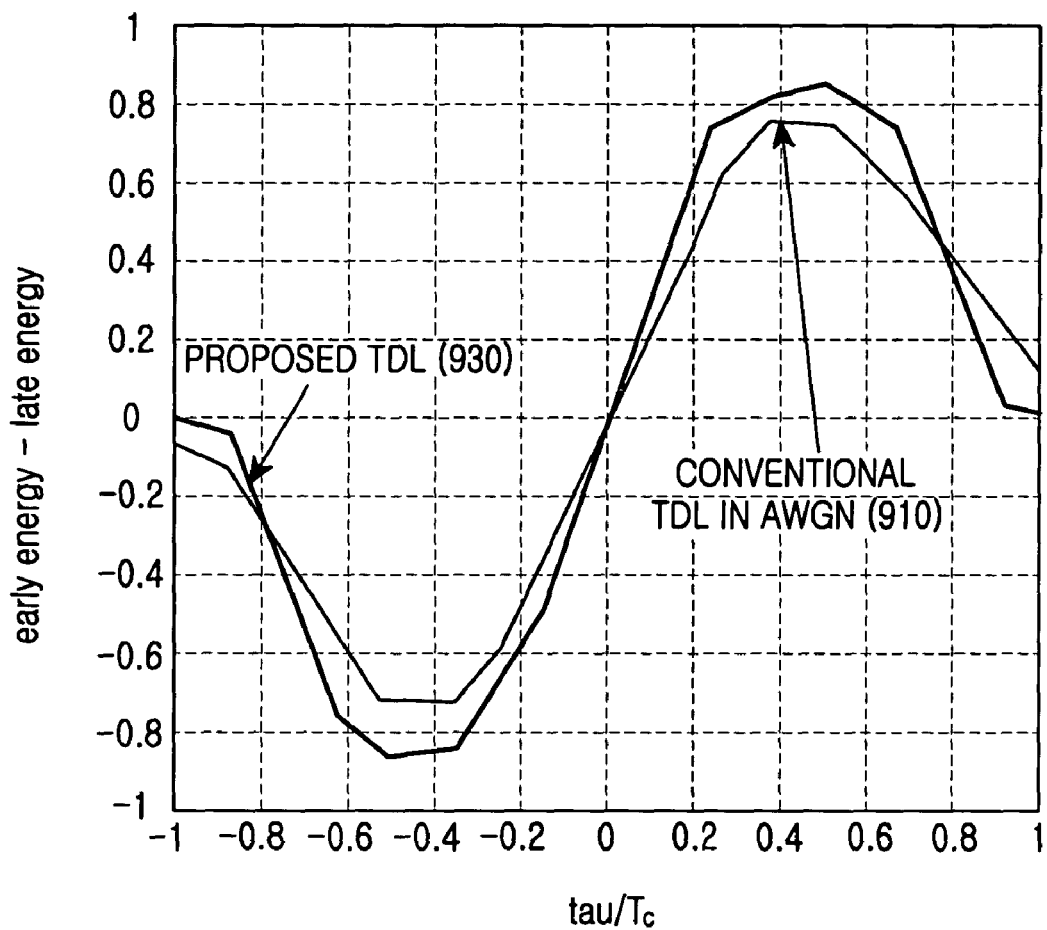
FIG. 9 is a graph illustrating an energy difference between an early path and a late path, measured by a TDL PN sequence phase tracking apparatus according to an embodiment of the present invention.

FIG. 9 is a graph illustrating an example of an energy difference between an early path and a late path, measured using the PN sequence phase tracking apparatus according to an embodiment of the present invention. In FIG. 9, The curve 910 represents the variation of the energy difference between an early path and a late path by the conventional TDL scheme in an additive white Gaussian noise (AWGN) environment The curve 930 represents the variation in an energy difference between an early path and a late path experienced by the proposed PN sequence phase tracking apparatus in a faing environment. As illustrated in FIG. 9, the curves 910 and 930 are almost identical to each other. Thus, it is learned that the variation of the energy difference between an early path and a late path experienced by the proposed PN sequence phase tracking apparatus is nearly independent of a fading.

The PN sequence phase tracking apparatus according to an embodiment of the present invention needs to have the second energy measurer 30 to measure the energy of an on-time path, resulting in the increase in hardware complexity. However, the whole or part of the second energy measurer 30 is already built in a receiver for other purposes such as the channel estimation and the measurement of on-time path energy for automatic frequency control. Thus, the introduction of the second energy measurer 30 does not result in the increase in hardware complexity in terms of the whole receiver.

By introducing only the marginal amount of hardware to the conventional TDL PN sequence phase tracking apparatus, the present invention can accurately measure an energy difference between an early path and a late path regardless of a fading.

While the invention has been shown and described with reference to a certain embodiment thereof, it will be understood by those skilled in the art that various changes in form and details may be made therein without departing from the spirit and scope of the invention as defined by the appended claims. For example, although the invention has been described with reference to a mobile communication system in which a burst pilot signal is provided, the invention can also be applied to a communication system in which a pilot signal is provided continuously. In addition, the invention can be applied to all communication systems that track a PN sequence by receiving a burst pilot.

What is claimed is:

1. A mobile terminal apparatus for acquiring a phase of a pseudo-random noise (PN) sequence at the mobile terminal that is acquired from a signal received from a base station in a mobile communication system, the apparatus comprising:
   a first energy measurer for measuring energy of an early path and a late path from the acquired PN sequence;
   a second energy measurer for measuring energy of an on-time path from the acquired PN sequence;
   a first normalizer for normalizing energy of the first energy measurer with an energy measured by the second energy measurer; and
   a third energy measurer for tracking a phase of the PN sequence using the normalized energy from the first normalizer,
   wherein the third energy measurer comprises a delay processor for delaying the normalized energy for a predetermined time, and a subtractor for calculating a difference between the normalized energy and the delayed energy.

2. The apparatus of claim 1, wherein the first energy measurer alternatively measures the energy of an early path and a late path.

3. The apparatus of claim 1, further comprising a second normalizer for normalizing the energy difference calculated from the subtractor to a dynamic range.

4. The apparatus of claim 3, wherein the second normalizer outputs a value normalized in accordance with an equation $$y = \sqrt{2} \cdot x \cdot \exp\left(-\frac{|x|}{\sqrt{e}}\right)$$

where x is the energy difference calculated from the subtractor, and y is an output.

5. The apparatus of claim 1, wherein the receiving signal is provided from the base station to the mobile terminal as pilot signal on a burst basis.

6. The apparatus of claim 1, wherein the second energy measurer comprises:
a local PN sequence generator for generating the PN sequence having an on-time path's phase; and
a PN despreader for despreading the received signal with the PN sequence having the on-time path's phase.

7. The apparatus of claim 6, wherein the local PN sequence generator resets the on-time path's phase using the energy difference calculated from the subtractor and generates a PN sequence having the reset on-time path's phase.

8. The apparatus of claim 1, wherein the first normalizer includes a divider for dividing energy of the first energy measurer by energy of the second energy measurer.

9. A method for acquiring a phase of a pseudo-random noise (PN) sequence at a mobile terminal that is acquired from a signal received from a base station in a mobile communication system, the method comprising the steps of:
measuring by a first energy measurer a first energy comprising energy of an early path and a late path from an acquired PN sequence;
measuring by a second energy measurer a second energy comprising energy of an on-time path from the acquired PN sequence;
normalizing by a first normalizer the first energy with the second energy;
tracking a phase of the PN sequence using the normalized energy value;
delaying by a delay processor the normalized energy value for a predetermined time; and
calculating by a subtractor a difference between the normalized energy and the delayed energy.

10. The method of claim 9, wherein the step of measuring energy by the first energy measurer comprises the step of alternately measuring energy of the early path and energy of the late path.

11. The method of claim 9, further comprising the step of normalizing the energy difference to a dynamic range by a second normalizer.

12. The method of claim 11, wherein the step of normalizing the energy difference to a dynamic range comprises the step of outputting a value normalized in accordance with an equation $$y = \sqrt{2} \cdot x \cdot \exp\left(-\frac{|x|}{\sqrt{e}}\right)$$

where x is the energy difference calculated by the subtractor, and y is an output.

13. The method of claim 9, wherein the received signal is provided from the base station to the mobile terminal as a pilot signal on a burst basis.

14. The method of claim 9, wherein the step of measuring the second energy value comprises the steps of:
generating a PN sequence having an on-time path's phase; and
despreading by a PN despreader the received signal with the PN sequence having the on-time path's phase.

15. The method of claim 14, wherein the local PN sequence generator resets the on-time path's phase using the energy difference calculated by the subtractor and generates a PN sequence having the reset on-time path's phase.

16. The method of claim 9, wherein the normalization step by the first normalizer comprises the step of dividing the first energy value by the second energy value.

17. A mobile terminal apparatus for acquiring a phase of a pseudo-random noise (PN) sequence at the mobile terminal that is acquired from a signal received from a base station in a mobile communication system, the apparatus comprising:
a switch for selecting a local PN sequence generator so that energy values of an early path and a late path can be measured for a phase of the acquired PN sequence;
a first energy measurer for calculating an energy value of a path selected by the switch;
the local PN sequence generator for resetting an on-time path's phase using an energy difference of the selected path, generating a PN sequence having the on-time path's phase, and providing the generated PN sequence to the first energy measurer;
a second energy measurer for measuring an energy value of an on-time path from the acquired PN sequence;
a first normalizer for normalizing energy measured by the first energy measurer with an energy measured by the second energy measurer;
a third energy measurer for tracking a phase of the PN sequence using the normalized energy from the first normalizer;
a delay processor for delaying the normalized energy for a predetermined time; and
a subtractor for calculating a difference between the normalized energy and the delayed energy.

18. The apparatus of claim 17, wherein the first energy measurer alternatively measures each energy of an early path and a late path.

19. The apparatus of claim 17, further comprising a second normalizer for normalizing the energy difference calculated by the subtractor to a dynamic range.

20. The apparatus of claim 19, wherein the second normalizer outputs a value normalized in accordance with an equation $$y = \sqrt{2} \cdot x \cdot \exp\left(-\frac{|x|}{\sqrt{e}}\right)$$

where x is the energy difference from the subtractor, and y is an output.

21. The apparatus of claim 17, wherein the received signal is provided from the base station to the mobile terminal as a pilot signal on a burst basis.

22. The apparatus of claim 17, wherein the first normalizer includes a divider for dividing an energy value of the first energy measurer by energy of the second energy measurer.

* * * * *